United States Patent [19]

Kim

[11] Patent Number: 5,625,476

[45] Date of Patent: Apr. 29, 1997

[54] METHOD FOR FORMING A COMMON TRANSFER CONTACT OF A THIN FILM TRANSISTOR LIQUID CRYSTAL DISPLAY

[75] Inventor: Dong-kyu Kim, Kyonggi-do, Rep. of Korea

[73] Assignee: Samsung Electronics Co., Ltd., Suwon, Rep. of Korea

[21] Appl. No.: 580,703

[22] Filed: Dec. 29, 1995

[30] Foreign Application Priority Data

Dec. 30, 1994 [KR] Rep. of Korea ............... 94-39685

[51] Int. Cl.⁶ ..................... G02F 1/1345; G02F 1/1339
[52] U.S. Cl. ............................ 349/149; 349/153
[58] Field of Search ................. 359/88, 80, 81, 359/87

[56] References Cited

U.S. PATENT DOCUMENTS

| | | | |
|---|---|---|---|
| 4,469,410 | 9/1984 | Ikesue | 359/88 |
| 4,767,189 | 8/1988 | Hayashi et al. | 359/88 |
| 4,917,466 | 4/1990 | Nakamura et al. | 359/88 |
| 4,930,876 | 6/1990 | Suzuki et al. | 359/88 |
| 5,179,460 | 1/1993 | Hinata et al. | 359/88 |
| 5,270,848 | 12/1993 | Takabayashi et al. | 359/88 |
| 5,467,210 | 11/1995 | Kishigami | 359/88 |
| 5,519,524 | 5/1996 | Fergason et al. | 359/88 |
| 5,528,403 | 6/1996 | Kawaguchi et al. | 359/88 |

*Primary Examiner*—Anita Pellman Gross
*Assistant Examiner*—Toan Ton
*Attorney, Agent, or Firm*—Cushman Darby & Cushman, IP Group of Pillsbury Madison & Sutro LLP

[57] ABSTRACT

A method for forming a common transfer contact of a liquid crystal display between a common electrode substrate and a thin film transistor substrate includes the steps of printing a seal pattern of a proper sealant on the common electrode substrate, assembling the common electrode substrate and the thin film transistor substrate by means of the seal pattern, cutting the common electrode substrate along a properly defined cutting line, and dotting the gap between the common electrode substrate and the thin film transistor substrate with an electrically conductive liquid-phase substance of a high viscosity to penetrate the gap by capillary action to thereby establish a common transfer contact between the common electrode substrate and the thin film transistor when being hardened.

11 Claims, 6 Drawing Sheets

METHOD FOR FORMING A COMMON TRANSFER CONTACT OF A THIN FILM TRANSISTOR LIQUID CRYSTAL DISPLAY

BACKGROUND OF THE INVENTION

1. Field of the Invention

The present invention concerns a method for forming a common transfer contact on a thin film transistor (TFT) liquid crystal display (LCD) and the resulting apparatus, wherein a common transfer contact serves to connect an electrode disposed on a common electrode substrate to another electrode arranged on a TFT substrate.

2. Description of the Related Art

A TFT LCD typically includes pixels each connected to a TFT transistor formed of amorphous silicon coated on a glass substrate. The liquid crystals are twisted nematic (TN). In such a TFT LCD, each pixel is turned on only when receiving an electrical signal, to avoid cross talk phenomena. Additionally, each pixel is connected with an electrical capacitance formed by the thin film, which stores electrical charges to keep a display image even during a non-selection period.

The processing steps of fabricating the TFT LCD includes:

1. Preparing a TFT substrate
2. Preparing a common electrode substrate
3. Assembling the substrates together
4. Filling liquid crystals
5. Testing
6. Fabricating a module For the TFT LCD to operate properly, an electrical transfer contact must be provided between the TFT and the common electrode substrates. This electrical transfer contact serves to connect an electrode disposed on the common electrode substrate to another electrode arranged on the TFT substrate. A conventional method of forming the transfer contact of the TFT LCD will now be described with reference to FIGS. 1 to 6.

A common electrode substrate 1 with an alignment layer is printed with a seal pattern 3 of a proper sealant such as thermosetting resin by employing a screen mask, as shown in FIG. 1. The seal pattern 3 is to seal the inside between the common electrode substrate 1 and the TFT transistor substrate 2 assembled with a proper gap. After printing the seal pattern 3, a conductive material such as Ag is dotted to form a transfer contact 4 along the outside of the seal pattern 4.

Thereafter, the common electrode substrate 1 and the TFT substrate 2 are pressed together with heat facing each other, so that the seal pattern 3 and the transfer contact 4 are hardened to sealingly assemble the two substrates with a proper cell gap maintained by the spacers (not shown) interposed between the two substrates, as shown in FIG. 3. Cutting the common electrode substrate 1 along a cutting line 6 as shown in FIG. 4, the cross section of the assembled LCD has a structure as shown in FIG. 5.

Such method of forming the transfer contact increases the seal region L1 occupied by the seal pattern 3 and the transfer contact 4, as shown in FIG. 6, so that the effective display region 5 is reduced compared to the seal region.

Another conventional structure of the common transfer contact is disclosed in U.S. Pat. No. 4,469,410 entitled "Common Transfer Contact for Liquid Crystal Display Cell or Electrochromic Display Cell" granted on Sep. 4, 1984, where the common transfer contact 4 is encircled by a seal material 3 when sealingly assembling the TFT substrate 2 and the common electrode substrate 1, as shown in FIG. 7. This structure also cannot help but decrease the effective display region compared to the seal region.

SUMMARY OF THE INVENTION

It is an object of the present invention to provide a method for forming the transfer contact between the common electrode substrate and the TFT substrate in a TFT LCD so as to increase the effective display region compared to the seal region.

According to the present invention, a method for forming a common transfer contact of an LCD with a common electrode substrate and a TFT substrate comprises the steps of printing a seal pattern of a proper sealant on the common electrode substrate, assembling the common electrode substrate and the TFT substrate by means of the seal pattern, cutting the common electrode substrate along a properly defined cutting line, and dotting the gap between the common electrode substrate and the TFT substrate with an electrically conductive liquid-phase substance of a high viscosity to penetrate the gap by capillary action so as to establish a common transfer contact between the common electrode and the TFT substrate upon hardening.

BRIEF DESCRIPTION OF THE ATTACHED DRAWINGS

The present invention will now be described more specifically with reference to the drawings, wherein.

DETAILED DESCRIPTION OF PREFERRED EMBODIMENTS

Figure 1:
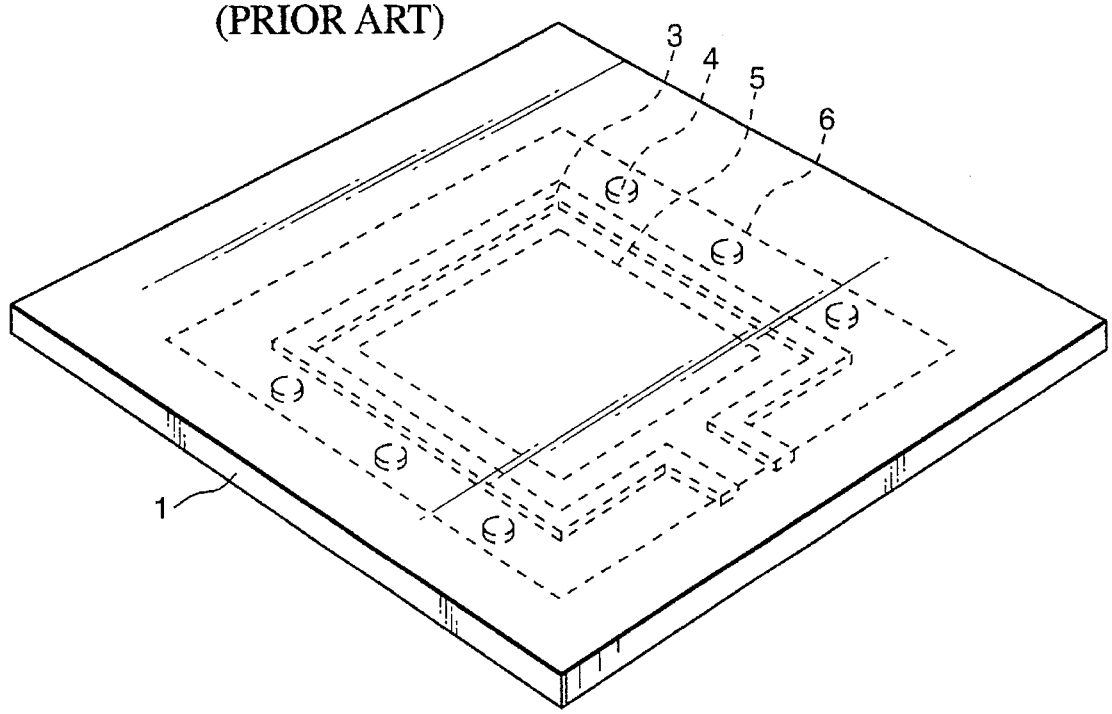
FIG. 1 is a perspective view illustrating a TFT substrate of a conventional TFT LCD.
Figure 2:
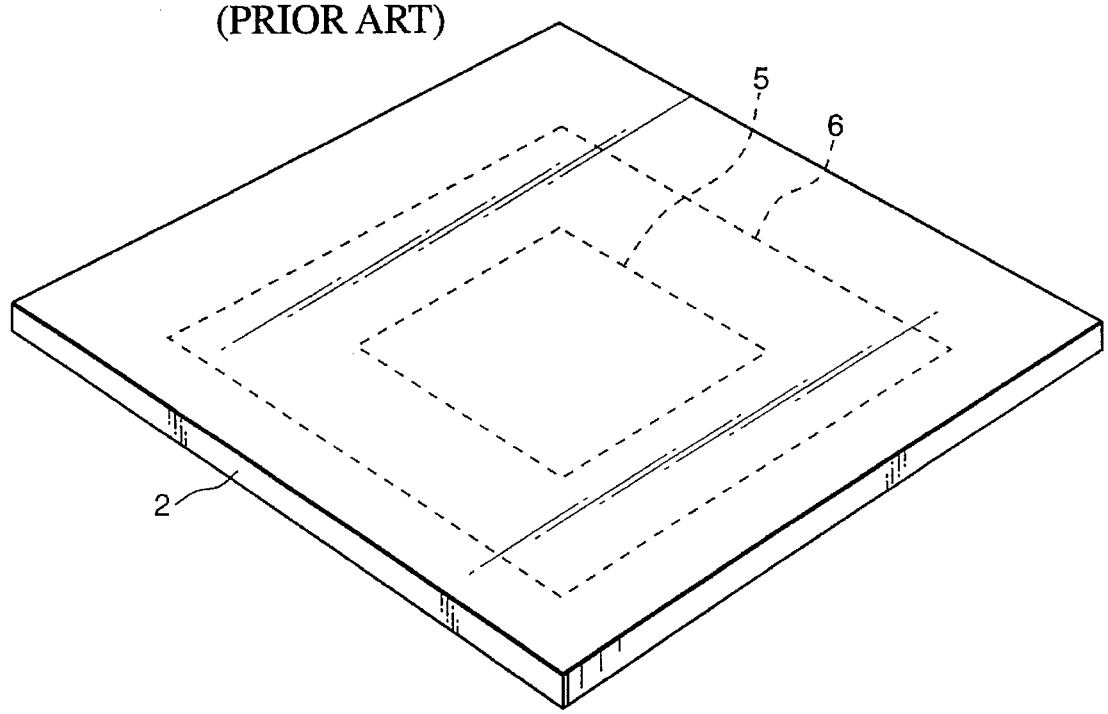
FIG. 2 is a perspective view illustrating a common electrode substrate of the conventional TFT LCD.
Figure 3:
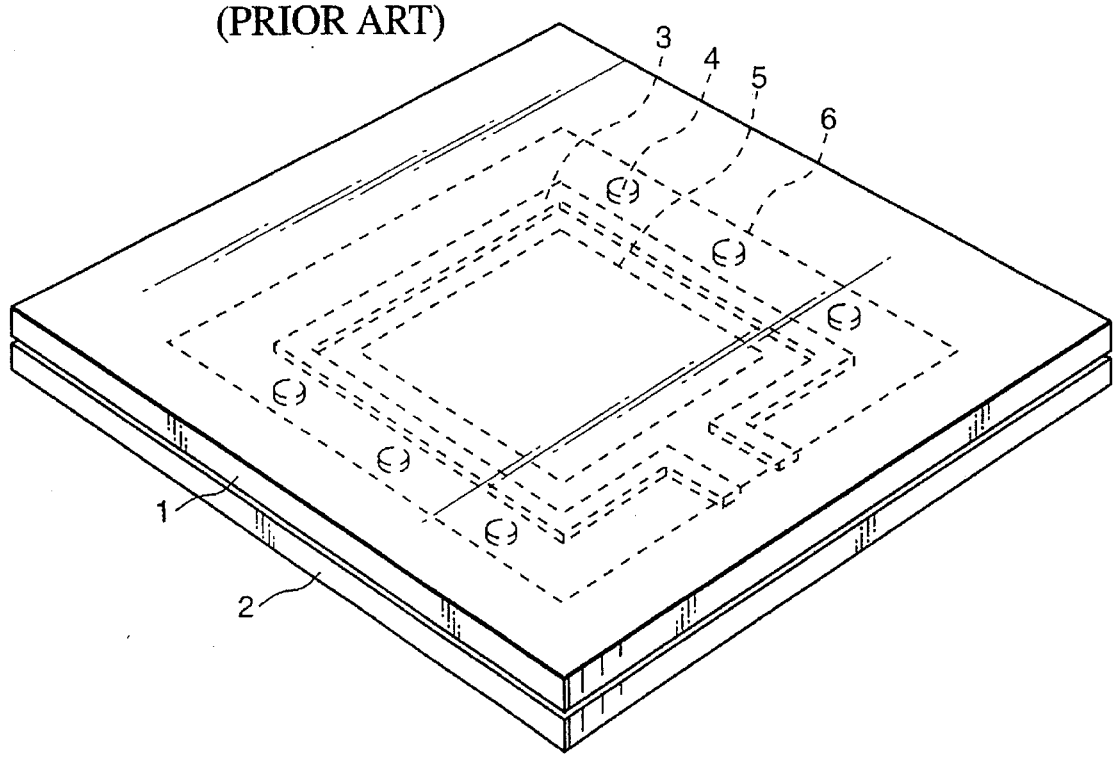
FIG. 3 is a perspective view illustrating a common electrode substrate of FIG. 1 assembled with the TFT substrate in thee conventional TFT LCD.
Figure 4:
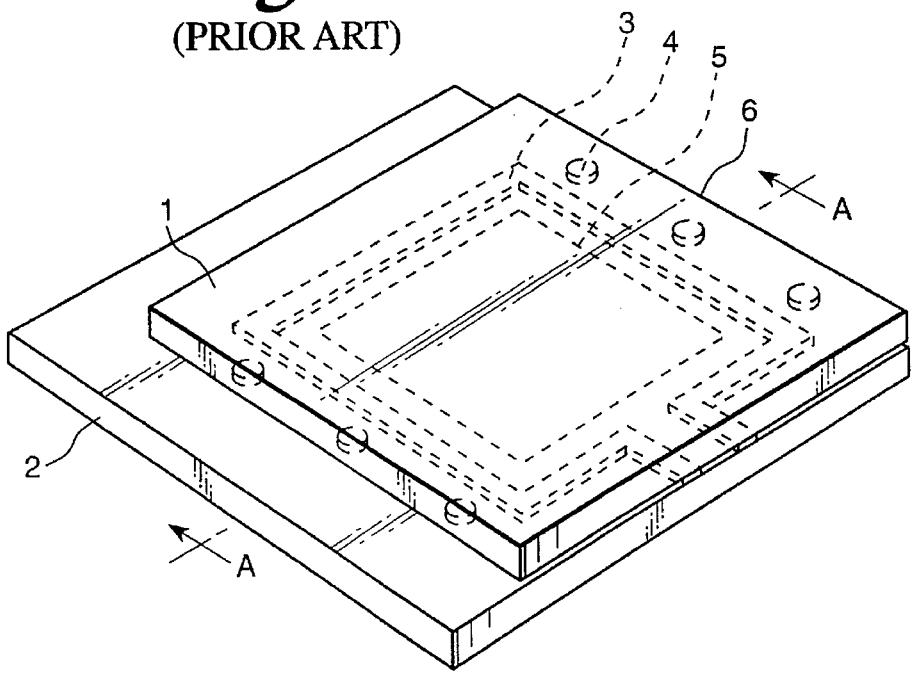
FIG. 4 is a perspective view illustrating the TFT LCD cut along a cutting line.
Figure 5:
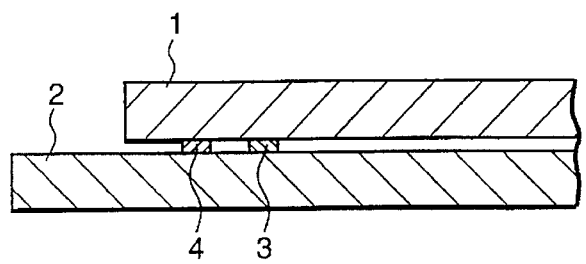
FIG. 5 is a cross sectional view taken along line A—A of FIG. 4.

The inventive method of forming the transfer contact will now be described with reference to FIGS. 8–11. For the sake of convenience, the same reference numerals are used to indicate the corresponding parts throughout all the drawings.

Figure 8:
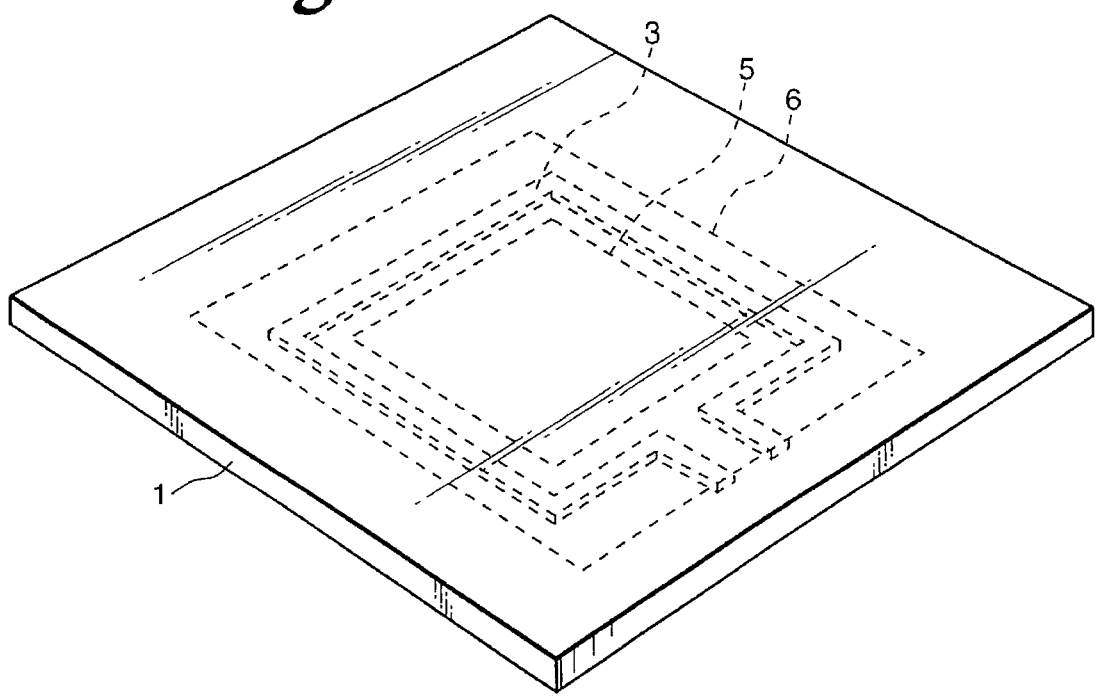
FIG. 8 is a perspective view illustrating the TFT substrate of a TFT LCD according to the present invention.
Figure 9:
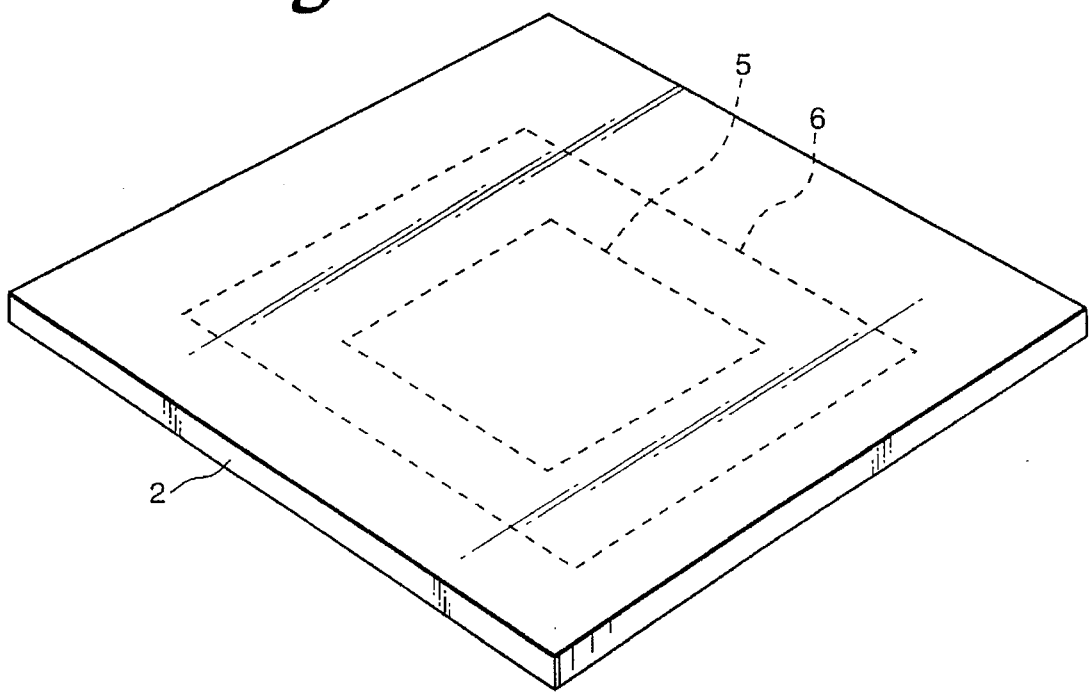
FIG. 9 is a perspective view illustrating the common electrode of the TFT LCD according to the present invention.
Figure 10:
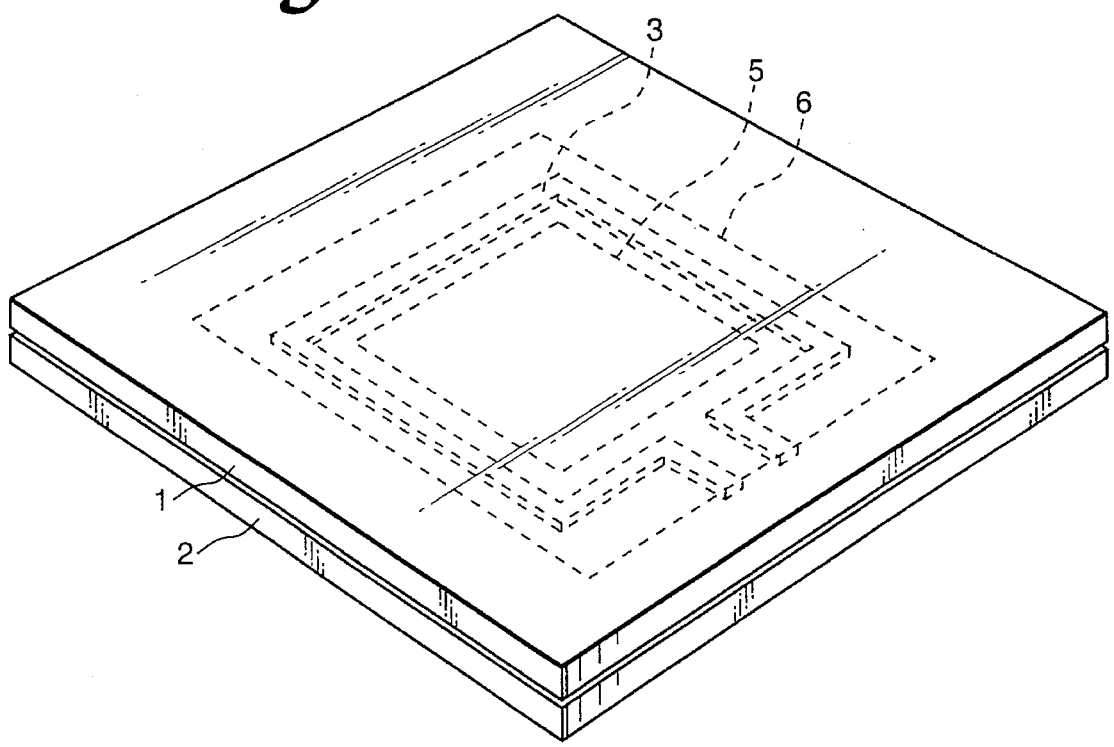
FIG. 10 is a perspective view illustrating the common electrode substrate assembled with the TFT substrate in the TFT LCD according to the present invention.
Figure 11:
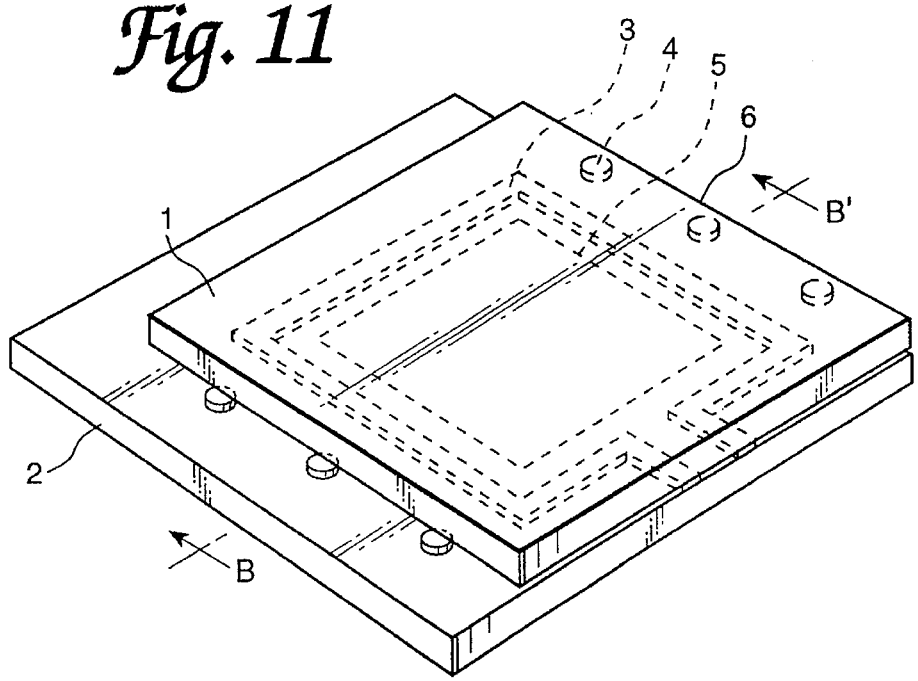
FIG. 11 is a perspective view illustrating the inventive TFT LCD cut along a cutting line.

The common electrode substrate 1, as shown in FIG. 8, having an alignment layer, has a seal pattern 3 of a thermosetting resin printed on it, as shown in FIG. 9. Then, as shown in FIG. 10, the common electrode substrate 1 and the TFT substrate 2 are sealingly assembled with the seal pattern 3 interposed therebetween by subjecting the structure to a pressing process with heating. The common electrode substrate 1 is then cut along a cutting line 6, as shown in FIG. 11. Finally, a gap between the common electrode substrate 1 and the TFT substrate 2 is dotted with an electrically conductive liquid-phase substance having high viscosity to penetrate the gap by capillary action to establish a common transfer contact 4 between the substrates upon hardening.

Figure 12:
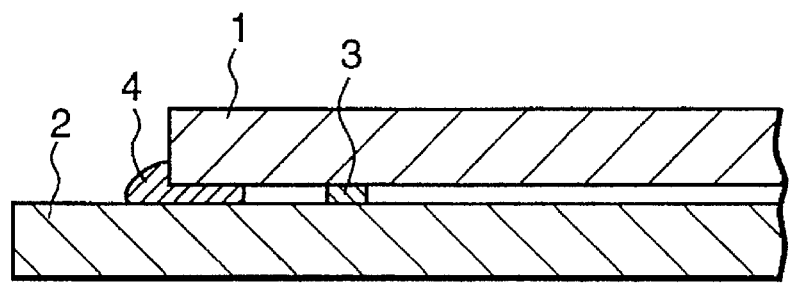
FIG. 12 is a portion of the cross sectional view taken along line B–B' of FIG. 11.
Figure 13:
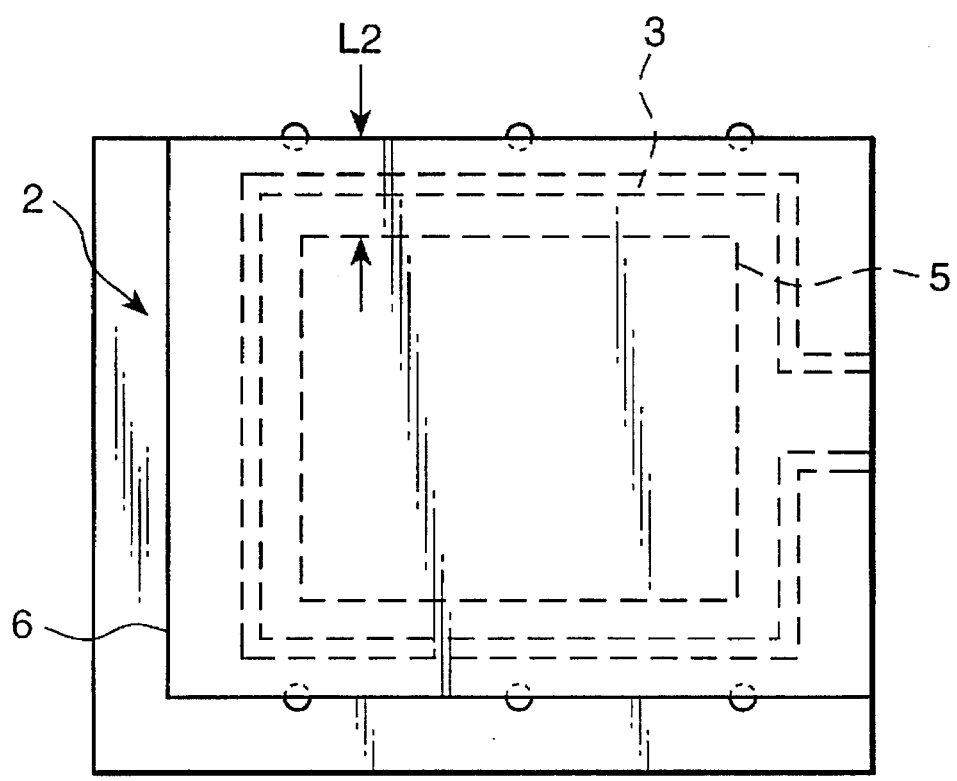
FIG. 13 is a plane view of FIG. 11.

Thus, the transfer contact 4 is formed as shown in FIG. 12, so that the size of the effective display region 5, as shown in FIG. 13, is largely increased because the area of the seal region L2 comprising the seal pattern 3 and the transfer contact is considerably reduced.

When dotting the gap with the liquid-phase substance, the seal print serves to prevent it from penetrating into the inside of the effective display region 5. Provided between the two substrates are spacers (not shown) to maintain the cell gap after subjecting the structure to the pressing process. The liquid-phase substance is thereafter hardened to establish the transfer contact 4 soon after the dotting process, as shown in FIGS. 12 and 13.

Figure 6:
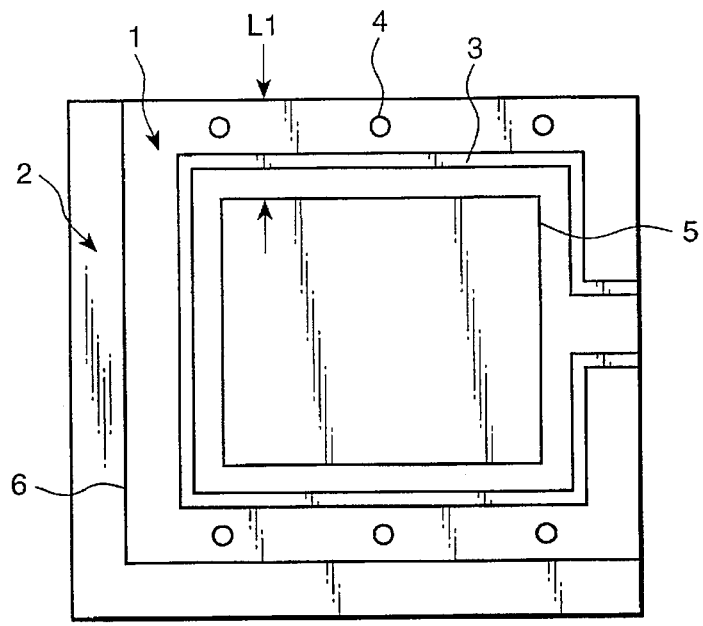
FIG. 6 is a plane view of FIG. 4.
Figure 7:
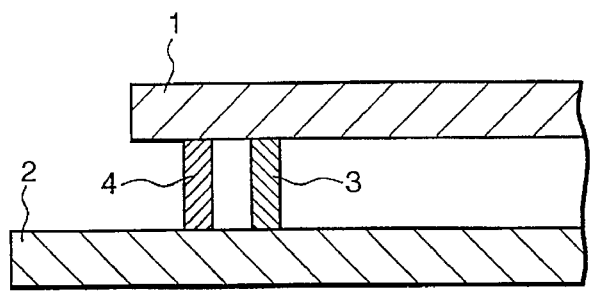
FIG. 7 is a cross sectional view illustrating the transfer contact encircled by the seal material in another conventional TFT LCD.

As described above, the inventive seal region L2 of FIG. 13 has a much smaller width than the conventional seal region L1 of FIG. 6, so that the relative size of the effective display region 5 can be considerably increased.

it is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A method for forming a common transfer contact of a liquid crystal display with a common electrode substrate and a thin film transistor substrate, the method comprising the steps of:

assembling said common electrode substrate and said thin film transistor substrate to form a gap therebetween, dotting said gap between said common electrode substrate and said thin film transistor substrate with an electrically conductive liquid-phase substance which penetrates said gap to establish said common transfer contact.

2. The method of claim 1, wherein said electrically conductive liquid-phase substance penetrates said gap by capillary action.

3. The method of claim 1, further comprising the step of hardening said electrically conductive liquid-phase substance after said electrically conductive liquid-phase substance penetrates said gap.

4. The method of claim 1, further comprising the step of printing a seal pattern of a sealant on said common electrode substrate before assembling said common electrode and said thin film transistor substrate so that said seal pattern is located in the gap between said common electrode substrate and said thin film transistor substrate.

5. The method of claim 1, further comprising the step of cutting said common electrode substrate along a cutting line.

6. The method of claim 1, wherein said electrically conductive liquid-phase substance has a high viscosity.

7. A liquid crystal display, comprising:

a common electrode substrate, a thin film transistor substrate mounted adjacent said common electrode substrate such that a gap is formed between said common electrode substrate and said thin film transistor substrate, and a common transfer contact formed in the gap between said common electrode substrate and said thin film transistor substrate with an electrically conductive liquid-phase substance which penetrates the gap between said common electrode substrate and said thin film transistor substrate to establish said common transfer contact.

8. The liquid crystal display according to claim 7, wherein said electrically conductive liquid-phase substance penetrates the gap between said common electrode substrate and said thin film transistor substrate by capillary action.

9. The liquid crystal display according to claim 7, wherein said electrically conductive liquid phase substance hardens after penetrating the gap.

10. The liquid crystal display according to claim 7, further comprising a sealant pattern interposed between said common electrode substrate and said thin film transistor substrate.

11. The liquid crystal display according to claim 7, wherein said electrically conductive liquid-phase substance is initially of a high viscosity.

* * * * *